US009571242B2

(12) United States Patent
Balraj

(10) Patent No.: US 9,571,242 B2
(45) Date of Patent: Feb. 14, 2017

(54) METHODS AND DEVICES FOR MITIGATING INTERFERENCE

(71) Applicant: Intel Mobile Communications GmbH, Neubiberg (DE)

(72) Inventor: Rajarajan Balraj, Nuremberg (DE)

(73) Assignee: Intel Deutschland GmbH, Neubiberg (DE)

( * ) Notice: Subject to any disclaimer, the term of this patent is extended or adjusted under 35 U.S.C. 154(b) by 552 days.

(21) Appl. No.: 13/871,079

(22) Filed: Apr. 26, 2013

(65) Prior Publication Data

US 2014/0321296 A1 Oct. 30, 2014

(51) Int. Cl.
*H04L 5/00* (2006.01)
*H04W 24/02* (2009.01)
*H04J 11/00* (2006.01)
*H04L 27/26* (2006.01)

(52) U.S. Cl.
CPC ............ *H04L 5/0032* (2013.01); *H04J 11/005* (2013.01); *H04W 24/02* (2013.01); *H04L 5/005* (2013.01); *H04L 27/2613* (2013.01)

(58) Field of Classification Search
CPC .. H04J 11/0023; H04J 11/005; H04L 25/0328; H04L 25/03299; H04L 25/0242
See application file for complete search history.

(56) References Cited

U.S. PATENT DOCUMENTS

| 9,136,953 B2 | 9/2015 | Yoo et al. | |
| 2002/0013164 A1* | 1/2002 | Leifer | H01Q 3/2611 455/562.1 |
| 2008/0181194 A1* | 7/2008 | Lindoff | H04J 11/0069 370/350 |
| 2009/0116568 A1 | 5/2009 | Lindoff et al. | |

(Continued)

FOREIGN PATENT DOCUMENTS

CN 102377698 A 3/2012

OTHER PUBLICATIONS

"Enabling Communication in Harsh Interference Scenarios"; 3GPP TSG-RAN WG1 #62; Aug. 23-27, 2010; p. 1-11.

(Continued)

*Primary Examiner* — Kevin C Harper
(74) *Attorney, Agent, or Firm* — Eschweiler & Associates, LLC

(57) ABSTRACT

A method includes receiving a signal including a two-dimensional signal pattern in a time-frequency representation, wherein the two-dimensional signal pattern includes a first reference signal at a predetermined first position in the two-dimensional signal pattern and at least one second reference signal at a predetermined second position in the two-dimensional signal pattern. The first reference signal includes cell identification information of a target cell of a cellular radio system and the at least one second reference signal includes cell identification information of at least one interfering cell of the cellular radio system. The method (Continued)

further includes determining a first noise covariance measure based on the first reference signal, determining at least one second noise covariance measure based on the at least one second reference signal, and mitigating an interference included in the received signal based on the first noise covariance measure and the at least one second noise covariance measure.

17 Claims, 12 Drawing Sheets

(56) References Cited

U.S. PATENT DOCUMENTS

| | | |
|---|---|---|
| 2012/0057480 A1 | 3/2012 | Yoo et al. |
| 2013/0089040 A1 | 4/2013 | Tabet et al. |
| 2014/0233407 A1* | 8/2014 | Pourahmadi ........ H04W 72/082 370/252 |

OTHER PUBLICATIONS

"FeICIC Baseline Receiver Assumptions"; TSG RAN WG4 meeting #62bis; Mar. 26-30, 2012; p. 1-6.

* cited by examiner

METHODS AND DEVICES FOR MITIGATING INTERFERENCE

FIELD

The disclosure relates to methods for mitigating interference in a receive signal. The disclosure further relates to devices for performing such methods.

BACKGROUND

Wireless communication networks may include multiple base stations and multiple User Equipments. Signals transmitted between components of a wireless communication network may include interference. Methods and devices employed in wireless communication networks constantly have to be improved. In particular, it may be desirable to mitigate interference occurring in wireless communication networks.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

Figure 1:
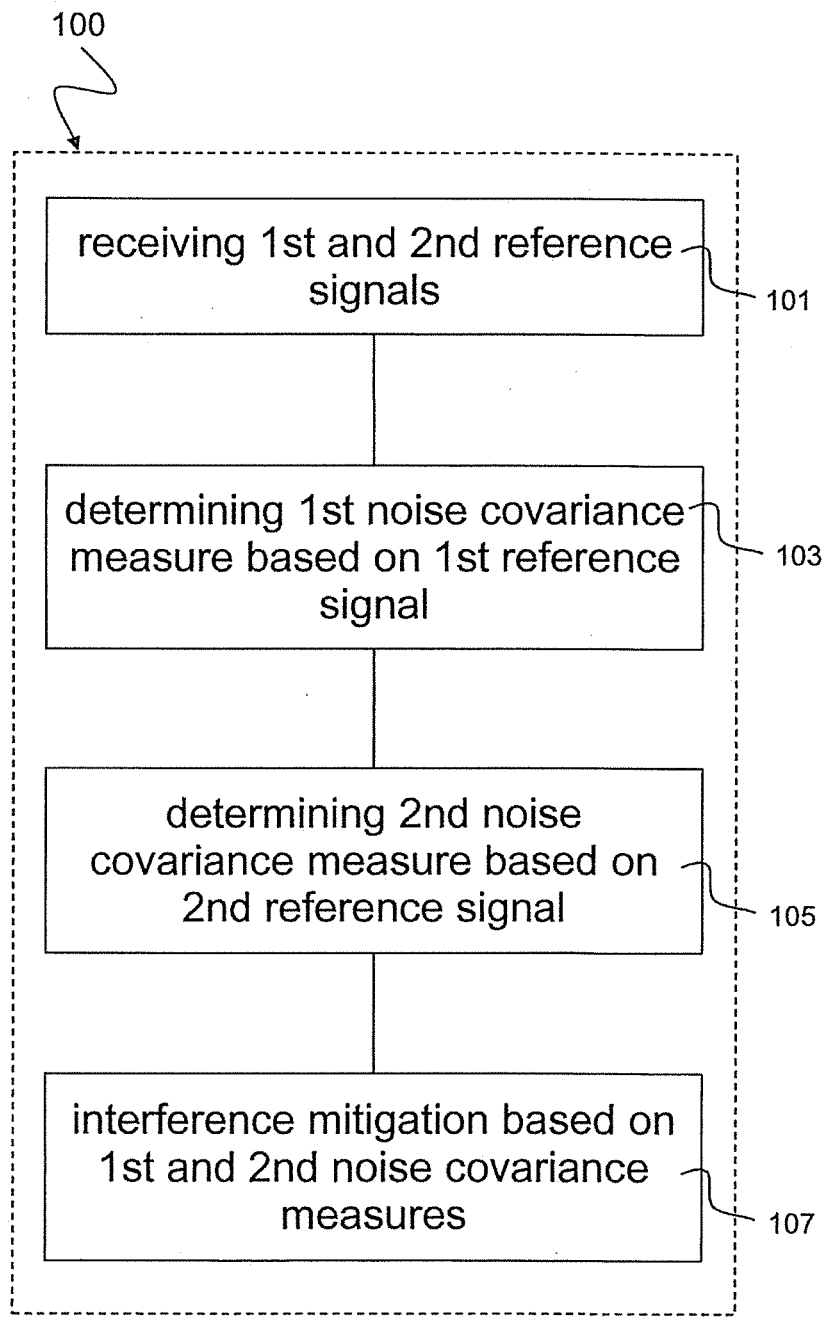
FIG. 1 is a schematic diagram of a method 100 in accordance with the disclosure for interference mitigation.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

Heterogeneous networks may utilize a mix of diverse base stations deployed in order to improve the spectral efficiency per unit area. Such a layered network deployment can consist of regular placement of macro base stations that typically transmit at high power level (~5-40 W), overlaid with several pico cells, femto cells and relays that typically transmit at lower power levels (~100 mW-2 W). The lower power cells may be deployed to eliminate coverage holes in the macro cells and to provide efficiency in hot spots.

In heterogeneous networks, there may be a difference between low and high power base stations which can result in unfair distribution of data rates and uneven user experience among the user terminals in the network. Macro cell transmission can be restricted from using the same time-frequency resources as the low-power node by resource partitioning (enhanced Inter Cell Interference Coordination, eICIC). Resource partitioning can be either in the frequency domain by using carrier aggregation or in the time domain by using almost blank subframes (ABS).

The following terms, abbreviations and notations will be used herein:
eICIC: enhanced Inter-Cell Interference Coordination,
ABS: Almost Blank Sub-frames,
CRS: Cell specific Reference Signal,
RE: Resource Element,
IRC: Interference Rejection Combining,
IM: Interference Mitigation,
IC: Interference Cancelling,
MMSE: Minimum Mean Square Error,
AP: Antenna Port,
SINR: Signal to Interference and Noise Ratio,
LTE: Long Term Evolution,
LTE-A: LTE Advanced, Release 10 and higher versions of LTE,
RF: Radio Frequency,
UE: User Equipment,
PDSCH: Physical Downlink Shared Channel,
PDCCH: Physical Downlink Control Channel,
MBSFN: Multicast/Broadcast over Single Frequency Network,
INR: Interference to Noise Ratio,
MCS: Modulation Coding Scheme,
EVA: Extended Vehicular A channel,
QPSK: Quadrature Phase Shift Keying,
QAM: Quadrature Amplitude Modulation,
RBSF: Resource Block Subframe, i.e., a resource block in frequency direction times subframe in time direction,
BER: Bit Error Rate,
BLER: Block Error Rate, EVA5: "Extended Vehicular A model" multi-path fading propagation conditions according to 3GPP technical Specification 36.101 V11.3.0, using a Doppler frequency of 5 Hz, ETU5: "Extended Typical Urban model" multi-path fading propagation conditions according to 3GPP technical specification 36.101 V11.3.0, using a Doppler frequency of 5 Hz.

The methods and devices described herein may be based on two-dimensional signal patterns, reference resource elements and covariance measures. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various example aspects described herein may be combined with each other, unless specifically noted otherwise.

The methods and devices described herein may be implemented in wireless communication networks, in particular communication networks based on an LTE and/or OFDM standard. The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to about 300 GHz. The frequency range may correspond to frequencies of alternating current electrical signals used to produce and detect radio waves.

The methods and devices described herein after may be designed to implement mobile standards such as e.g. the Long Term Evolution (LTE) standard. LTE, marketed as 4G LTE, is a standard for wireless communication of high-speed data for mobile phones and data terminals. It is based on the GSM/EDGE and UMTS/HSPA network technologies, increasing the capacity and speed using a different radio interface together with core network improvements.

In the following, Orthogonal Frequency-Division Multiplexing (OFDM) systems are described. OFDM is a scheme for encoding digital data on multiple carrier frequencies. OFDM has developed into a popular scheme for wideband digital communication, whether wireless or over copper wires, used in applications such as digital television and audio broadcasting, DSL broadband internet access, wireless networks, and 4G mobile communications. OFDM is a Frequency-Division Multiplexing (FDM) scheme used as a digital multi-carrier modulation method. A large number of closely spaced orthogonal sub-carrier signals may be used to carry data. The orthogonality may prevent crosstalk between sub-carriers. The data may be divided into several parallel data streams or channels, one for each sub-carrier. Each sub-carrier may be modulated with a conventional modulation scheme (such as quadrature amplitude modulation or phase-shift keying) at a low symbol rate, maintaining total data rates similar to conventional single-carrier modulation schemes in the same bandwidth. OFDM may be essentially identical to coded OFDM (COFDM) and discrete Multi-Tone modulation (DMT).

In the following, covariance measures, covariance matrices, signal covariance measures, noise covariance measures and signal and interference covariance measures are described. The covariance measure may generalize the notion of variance to multiple dimensions. As an example, the variation in a collection of random points in two-dimensional space may not necessarily be characterized fully by a single number, nor would the variances in the x and y directions contain all of the necessary information; a $N_{Rx} \times N_{Rx}$ measure, where $N_{Rx}$ denotes the number of receive antennas, called the covariance measure may be necessary to fully characterize the two-dimensional variation. The covariance measure can be mathematically implemented as a covariance matrix, for example.

In probability theory and statistics, a covariance matrix (also known as a dispersion matrix or a variance covariance matrix) may be a matrix whose element in the position i, j is the covariance between the $i^{th}$ and $j^{th}$ elements of a random vector (that is, of a vector of random variables). Each element of the vector may be a scalar random variable, either with a finite number of observed empirical values or with a finite or infinite number of potential values specified by a theoretical joint probability distribution of all the random variables.

If the entries in a column vector $$X = \begin{bmatrix} X_1 \\ \vdots \\ X_n \end{bmatrix} \quad (1)$$

are random variables, each with finite variance, then the covariance matrix S may be the matrix whose entry (i,j) is the covariance $$\Sigma_{ij} = \text{cov}(X_i, X_j) = E[(X_i - \mu_i)(X_j - \mu_j)], \quad (2)$$

wherein $$\mu_i = E(X_i) \quad (3)$$

is the expected value of the i-th entry in the vector X.

In the following, multi-layer heterogeneous networks, macro cells, pico cells, femto cells, target cells, and interfering cells are described. Multi-layer heterogeneous networks (HetNet) may be used in LTE and LTE-Advanced standards to build up the network of not only a single type of eNodeB (homogeneous network), but to deploy eNodeBs with different capabilities, most importantly different Tx-power classes. These eNodeBs may commonly be referred to as macro eNodeBs (MeNB) or macro cells, pico eNodeBs (PeNB) or pico cells and femto/home eNodeBs (HeNB) or femto cells and meant for basic outdoor, outdoor hot-zone and indoor/enterprise coverage, respectively.

Macro cells may cover a large cell area (typical cell radius being of the order of 500 meters to a kilometer), with transmit antennas above the clutter and transmission power of the order of 46 dBm (20 watts). They may provide service to all users. Femto cells, also called Home eNodeBs (HeNBs) may be lower power cells installed (typically indoors) by an end-consumer. Pico cells may be operator deployed cells, with lower transmission powers—typically an order of magnitude smaller—relative to macro cell eNodeBs. They may be installed typically in wireless hotspot areas and provide access to all users. In a scenario where a UE is connecting to pico cells, the pico cell may represent the target cell while the macro cell may represent the interfering cell providing strong interference.

In the following, eICIC and Almost Blank Sub-frames (ABS) are described. eICIC may avoid heavy inter-cell interference on both data and control channels of the downlink. eICIC may be based on carrier aggregation with cross-carrier scheduling or based on Time-Domain Multiplexing (TDM) using so called ABS.

ICIC based on Carrier Aggregation may enable an LTE-A UE to connect to several carriers simultaneously. It not only may allow resource allocation across carriers, it also may allow scheduler based fast switching between carriers without time consuming handover. A simple principle in a HetNet scenario may be to partition the available spectrum into e.g. two separate component carriers and assign the primary component carriers (PCC) to different network layers. The primary component carrier may be the cell that provides the control information to the UEs. Each network layer can additionally schedule UEs on other CCs called Secondary Component Carriers (SCC).

ICIC based on Time Domain Multiplexing may periodically mute transmissions from eNodeBs inflicting severe interference onto others for entire sub-frames, so that the victim eNodeBs may have a chance to serve their UEs suffering from severe interference from the aggressor eNodeB in these sub-frames. This muting may be not necessarily complete, as certain signals such as Common reference symbols (unless configured as MBSFN sub-frame), Primary and Secondary Synchronization Signals (PSS and SSS), Physical Broadcast Channel (PBCH), SIB-1 and paging with their associated PDCCH may have to be transmitted even in otherwise muted sub-frames e.g. to avoid radio link failure or for reasons of backwards compatibility. Collisions of sub-frame muting with PSS, SSS, SIB-1 and paging should be minimized. Hence, muting in sub-frames #0, #1, #5 and #9 should be avoided as far as possible. Sub-frames thus muted may be referred to as ABS.

In the following, whitening filters, IRC receivers and MIMO detectors are described. Noise (and other additive distortions) usually may have non-flat amplitude spectrum. A noise whitening filter may equalize the spectrum of the signal, making it similar to the white noise spectrum. Noise whitening filters may enhance low level spectral components and may attenuate high level ones.

Interference Rejection Combining (IRC) is a technique that may be used in an antenna diversity system to suppress co-channel interference by using the cross covariance between the noise in diversity channels. Interference rejection combining (IRC) may be used as an efficient alternative to increase downlink bit rates in areas where cells overlap. An IRC receiver may be effective in improving the cell-edge user throughput because it may suppress inter-cell interference. The IRC receiver may be typically based on a Minimum Mean Square Error (MMSE) criteria, which may require channel estimation and covariance matrix estimation including the inter-cell interference with high accuracy.

Multiple-Input Multiple-Output (MIMO) wireless communication systems may employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band. A MIMO detector may be used for detecting the MIMO channel which may be described by the channel matrices between respective antennas of the transmitter and respective antennas of the receiver.

Figure 4:
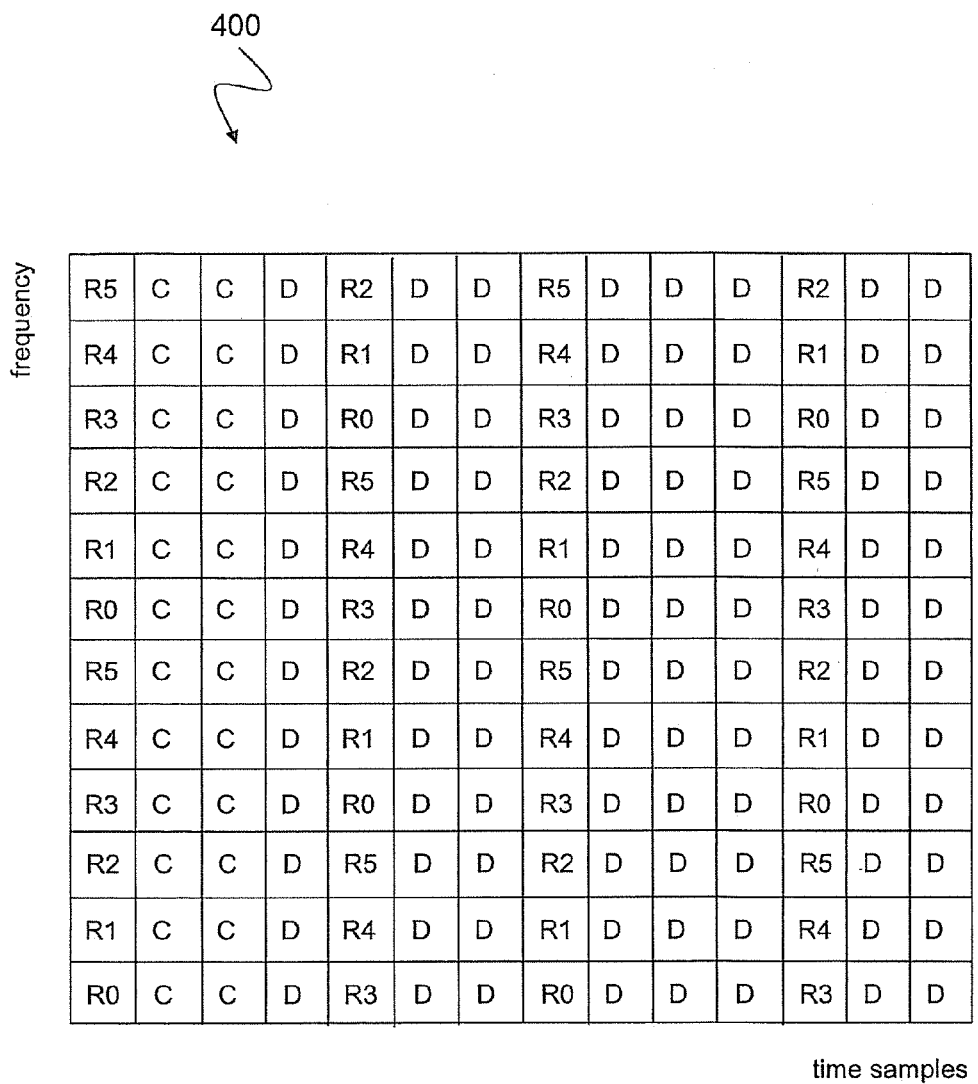
FIG. 4 is a schematic diagram of a receive signal including reference signals in a two-dimensional time-frequency representation 400.

FIG. 1 is a schematic diagram of a method 100 in accordance with the disclosure for interference mitigation. The method 100 includes receiving a signal including a two-dimensional signal pattern in a time-frequency representation at 101, e.g. as depicted in FIG. 4 described below. The two-dimensional signal pattern includes a first reference signal at a predetermined first position in the two-dimensional signal pattern and at least one second reference signal at a predetermined second position in the two-dimensional signal pattern. The first reference signal includes cell identification information of a target cell of a cellular radio system and the at least one second reference signal includes cell identification information of at least one interfering cell of the cellular radio system. The method 100 further includes determining a first noise covariance measure based on the first reference signal at 103. The method 100 further includes determining at least one second noise covariance measure based on the at least one second reference signal at 105. The method 100 further includes mitigating an interference included in the received signal based on the first noise covariance and the at least one second noise covariance measure at 107.

In one example, the first reference signal and the at least one second reference signal may include cell-specific reference signals. In one example, mitigating the interference includes noise-whitening. In an example embodiment, mitigating the interference may include interference rejection combining. In one example, mitigating the interference may include minimum mean square error estimation.

In one example, the first reference signal may include a first part corresponding to a first antenna port of the target cell and a second part corresponding to a second antenna port of the target cell. The at least one second reference signal may include a first part corresponding to a first antenna port of the interfering cell and a second part corresponding to a second antenna port of the interfering cell. Here, the term "corresponding" denotes that the first part of the first reference signal may be associated or received from the first antenna port of the target cell and that the second part of the first reference signal may be associated or received from the second antenna port of the target cell. Further, the term "corresponding" denotes that the first part of the second reference signal may be associated or received from the first antenna port of the interfering cell and that the second part of the second reference signal may be associated or received from the second antenna port of the interfering cell.

In one example, the position of the first part of the at least one second reference signal in the two-dimensional signal pattern may be spaced apart by a predetermined frequency shift from the position of the first part of the first reference signal in the two-dimensional signal pattern, wherein the predetermined frequency shift corresponds to an interfering cell. Here, the term "corresponding" denotes that the predetermined frequency shift may be characteristic for a specific interfering cell transmitting its reference signal at that position in the two-dimensional time-frequency grid or signal pattern.

In one example, the position of the second part of the at least one second reference signal in the two-dimensional signal pattern may be spaced apart by the predetermined frequency shift from the position of the second part of the first reference signal in the two-dimensional signal pattern. That means, the frequency distance in the two-dimensional time-frequency grid between the reference signal of the target cell and the reference signal of the interfering cell may be the same for each antenna port distance. That frequency distance may be characteristic for a specific target cell or interfering cell. However, some target cells and interfering cells may transmit reference signals using the same frequency distance or frequency shift which results in a superposition of reference signals at the same time and frequency in the two-dimensional time-frequency grid.

In one example, each of the at least one second reference signal may correspond to an interfering cell. In one example, the predetermined frequency shift may correspond to multiple interfering cells.

In one example of the method 100 also denoted as a method for parametric CRS interference mitigation, the method 100 may include determining the first noise covariance measure based on pilot signals of the target cell, and noise whitening first elements of the two-dimensional signal pattern located at a predetermined third position in the two-dimensional signal pattern indicating data resource elements of the target cell with no cell-specific reference signal interference and noise whitening channel estimates of the target cell corresponding to the first elements, wherein the noise whitening is based on the first noise covariance measure. The method further includes determining channel coefficients of an interfering cell with respect to the corresponding antenna port and frequency shift of the interfering cell, determining the at least one second noise covariance measure with respect to an antenna port and a frequency shift of the interfering cell based on the estimated channel coefficients with respect to the corresponding antenna port and frequency shift of the interfering cell, and noise whitening second elements of the two-dimensional signal pattern located at a predetermined fourth position in the two-dimensional signal pattern indicating data resource elements of the target cell hit with cell-specific reference signal interference and noise whitening channel estimates of the target cell corresponding to the second elements, wherein the noise whitening is based on the at least one second noise covariance measure.

In one example of the method for parametric CRS interference mitigation, determining the at least one second noise covariance measure and noise whitening the second elements of the two-dimensional signal pattern may be performed for each antenna port and frequency shift unequal to an antenna port and a frequency shift corresponding to the target cell.

In one example of the method 100 also denoted as a method for non-parametric CRS interference mitigation, the method 100 may include determining the first noise covariance measure based on pilot signals of the target cell, and noise whitening first elements of the two-dimensional signal pattern located at a predetermined third position in the two-dimensional signal pattern indicating data resource elements of the target cell with no cell-specific reference signal interference and noise whitening channel estimates of the target cell corresponding to the first elements, wherein the noise whitening is based on the first noise covariance measure. The method further includes determining the at least one second noise covariance measure with respect to an antenna port and a frequency shift of the interfering cell based on the at least one second reference signal with respect to the corresponding antenna port and frequency shift of the interfering cell and estimated channel coefficients of the target cell, and noise whitening second elements of the two-dimensional signal pattern located at a predetermined fourth position in the two-dimensional signal pattern indicating data resource elements of the target cell hit with cell-specific reference signal interference and noise whitening channel estimates of the target cell corresponding to the second elements, wherein the noise whitening is based on the at least one second noise covariance measure.

In one example of the method for non-parametric CRS interference mitigation, determining the at least one second noise covariance measure and noise whitening the second elements of the two-dimensional signal pattern may be performed for each antenna port and frequency shift unequal to an antenna port and a frequency shift corresponding to the target cell.

In one example of the method for non-parametric CRS interference mitigation, the effective channel coefficients can be directly estimated from UE-specific reference signals like DMRS or based on the channel estimates of CRS and a pre-coding matrix.

In one example of the method 100 also denoted as a method for CRS interference cancellation and rejection, the method 100 may include determining the first noise covariance measure based on pilot signals of the target cell, and noise whitening the first reference signal based on the first noise covariance measure. The method further includes determining channel coefficients of a predetermined number of interfering cells with respect to the corresponding antenna ports and frequency shifts of the interfering cells, and interference-canceling the at least one second reference signal with respect to the corresponding antenna ports and frequency shifts of the interfering cells based on the determined channel coefficients of the interfering cells. The method still further includes determining the at least one second noise covariance measure with respect to an antenna port and a frequency shift of the interfering cell based on the at least one interference-canceled second reference signal with respect to the corresponding antenna port and frequency shift of the interfering cell, and noise whitening the at least one interference-canceled second reference signal based on the at least one second noise covariance measure.

In one example of the method 100 for CRS interference cancellation and rejection, determining the channel coefficients of the predetermined number of interfering cells, interference-canceling the at least one second reference signals, determining the at least one second noise covariance measure and noise whitening the at least one interference-canceled second reference signal may be performed for each antenna port and frequency shift unequal to an antenna port and a frequency shift corresponding to the target cell.

In one example of the method 100 for CRS interference cancellation and rejection, the predetermined number of interfering cells with respect to an antenna port and frequency shift may be smaller than a number of dominant aggressor cells with respect to the corresponding antenna port and frequency shift.

In one example, the target cell may include a macro base station. In one example, the target cell may include a pico cell. In one example, the target cell may include a femto cell. In one example, the target cell may include a relay.

In one example, the method 100 may be implemented on a chip, e.g. a chip of a mobile device. In one example, the method 100 may be implemented on a device 200 as described below with respect to FIG. 2.

Figure 2:
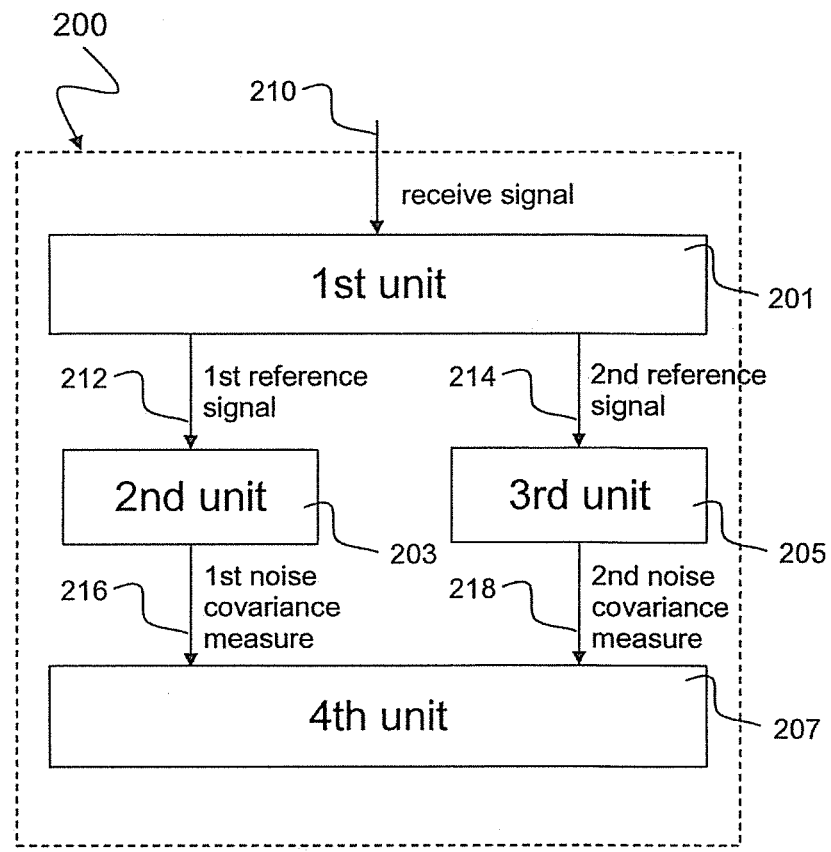
FIG. 2 is a schematic diagram of a device 200 in accordance with the disclosure mitigating an interference in a receive signal.

FIG. 2 is a schematic diagram of a device 200 in accordance with the disclosure mitigating an interference in a receive signal. The device 200, e.g. an interference mitigation receiver, includes a first unit 201, e.g. a receiver, configured to receive a signal 210 including a two-dimensional signal pattern in a time-frequency representation, e.g. as depicted in FIG. 4 described below. The two-dimensional signal pattern includes a first reference signal 212 at a predetermined first position in the two-dimensional signal pattern and at least one second reference signal 214 at a predetermined second position in the two-dimensional signal pattern. The first reference signal 212 includes cell identification information of a target cell of a cellular radio system and the at least one second reference signal 214 includes cell identification information of at least one interfering cell of the cellular radio system.

The device 200 further includes a second unit 203 configured to determine a first noise covariance measure 216 based on the first reference signal 212. The device 200 further includes a third unit 203 configured to determine at least one second noise covariance measure 218 based on the at least one second reference signal 214. The device 200 further includes a fourth unit 207 configured to mitigate an interference included in the received signal 210 based on the first noise covariance 216 and the at least one second noise covariance measure 218.

In one example, the device 200 may include a chip, and the device 200 may be part of a mobile device.

Figure 3:
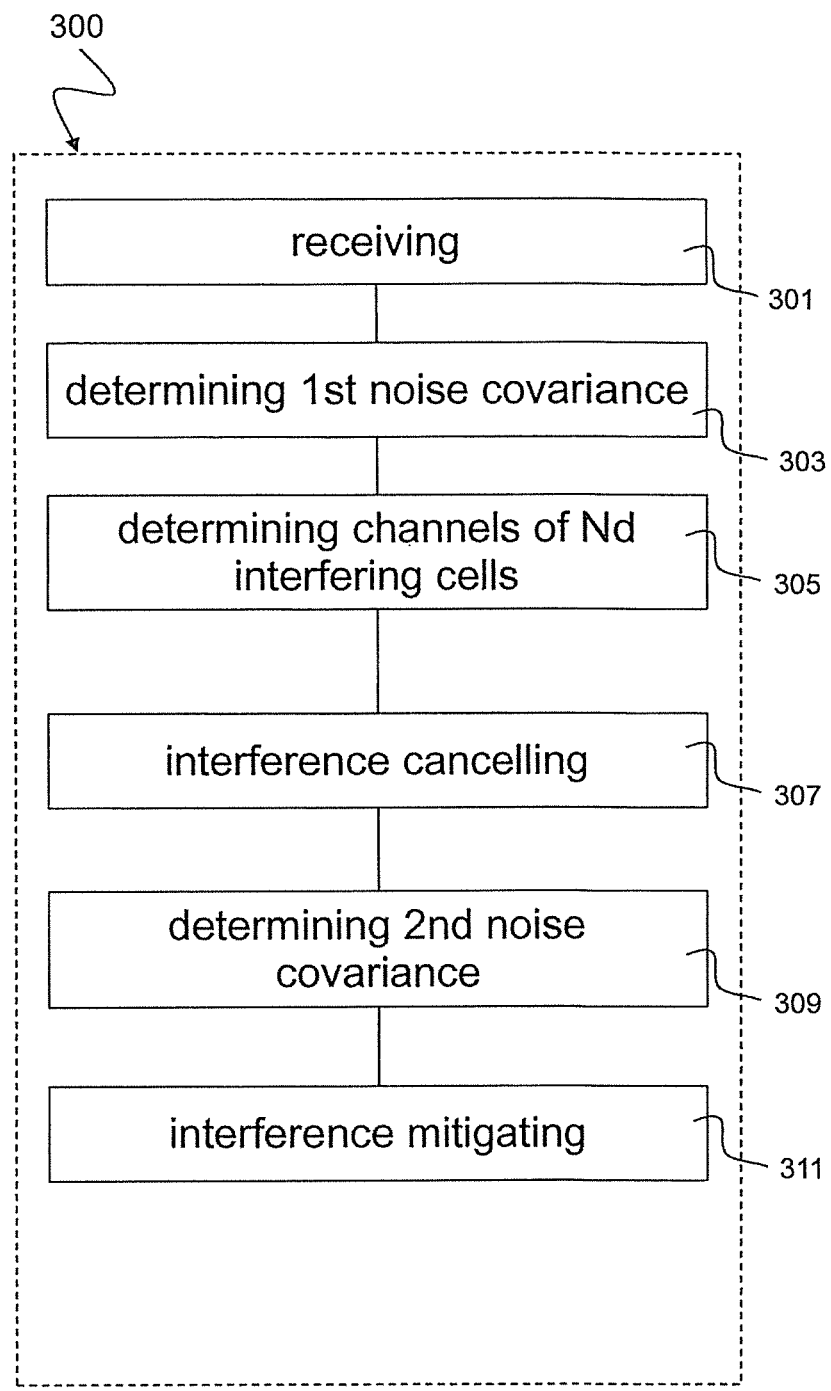
FIG. 3 is a schematic diagram of a method 300 in accordance with the disclosure for interference mitigation based on an interference-canceled reference signal.

FIG. 3 is a schematic diagram of a method 300 in accordance with the disclosure for interference mitigation based on an interference-canceled reference signal. The method 300 includes receiving a signal including a two-dimensional signal pattern in a time-frequency representation, e.g. as depicted in FIG. 4 described below at 301. The two-dimensional signal pattern includes a first reference signal at a predetermined first position in the two-dimensional signal pattern and at least one second reference signal at a predetermined second position in the two-dimensional signal pattern. The first position represents an antenna port and a frequency shift of a target cell of a cellular radio system and the second position represents an antenna port and a frequency shift of at least one interfering cell of the cellular radio system. The method 300 further includes determining a first noise covariance measure based on pilot signals of the target cell at 303. The method 300 further includes determining channel coefficients of a predetermined number of interfering cells with respect to corresponding antenna ports and frequency shifts of the interfering cells at 305. The method 300 further includes interference-canceling the at least one second reference signal with respect to the corresponding antenna ports and frequency shifts of the interfering cells based on the determined channel coefficients of the interfering cells at 307. The method 300 further includes determining at least one second noise covariance measure with respect to an antenna port and a frequency shift of the interfering cell based on the at least one interference-canceled second reference signal with respect to the corresponding antenna port and frequency shift of the interfering cell at 309. The method 300 further includes mitigating an interference included in the received signal based on the first noise covariance measure and the at least one second noise covariance measure at 311.

In one example, the method 300 may include the example of the method 100 denoted as method for CRS interference cancellation and rejection as described above with respect to FIG. 1.

In one example, the target cell may include a macro base station. In one example, the target cell may include a pico cell. In one example, the target cell may include a femto cell. In one example, the target cell may include a relay.

In one example, the method 300 may be implemented on a chip, e.g. a chip of a mobile device. In one example, the method 300 may be implemented on a device 200 as described above with respect to FIG. 2.

FIG. 4 is a schematic diagram of a receive signal including reference signals in a two-dimensional time-frequency representation 400. The horizontal axis denotes the time samples and the vertical axis denotes the frequency. The signal pattern includes data signals "D", control signals "C", and reference signals "R0", "R1", "R2", "R3", "R4" and "R5". In one example, data and control signals may be not distorted by aggressor cells.

The two-dimensional signal pattern may also be denoted as a "resource block" or more particular as an "RBSF" (resource block subframe). An RBSF may be defined as a block having a length of one resource block (e.g. 180 kHz) in the frequency direction and a length of one subframe (e.g. 1 ms) in the time direction.

The two-dimensional time-frequency representation 400 may be specified according to 3GPP technical specification 36.211, e.g. version V8.4.0 or higher. In an ABS scenario, only LTE Rel-8 cell specific reference signals (CRS), synchronization signals and broadcast messages may be transmitted to enable full backward compatibility. The transmission of CRS, however, may cause unwanted interference on PHICH, PCFICH, PDCCH and PDSCH in the midst of this "interference-free tunnel". FIG. 4 illustrates the REs of different physical channels that may be affected by CRS interference from non-colliding aggressors.

The symbols "R0" denote CRS antenna port 0 of target cell with CRS-shift 0. The symbols "R3" denote CRS antenna port 1 of target cell with CRS-shift 0. The symbols "D" denote data REs with no CRS interference from aggressors. The symbols "C" denote PDCCH REs with no CRS interference from aggressors. The symbols "R1" denote Data/PDCCH REs with CRS interference from aggressor at antenna port 0 and CRS-shift 1. The symbols "R4" denote Data/PDCCH REs with CRS interference from aggressor at antenna port 1 and CRS-shift 1. The symbols "R2" denote Data/PDCCH REs with CRS interference from aggressor at antenna port 0 and CRS-shift 2. The symbols "R5" denote Data/PDCCH REs with CRS interference from aggressor at antenna port 1 and CRS-shift 2.

In one example, the two-dimensional signal pattern 400 may include a resource block of an Orthogonal Frequency Division Multiplexing system. In one example, the received signal may include a radio signal including a plurality of radio frames, each radio frame including a plurality of sub-frames and each sub-frame including a plurality of subcarriers. In one example, the target cell and the interfering cell may be dimensioned according to an LTE standardization, in particular to Release 10 or higher thereof, including eICIC. In one example, the target cell may be a pico cell and the interfering cell may be a macro cell of a heterogeneous LTE network as described below with respect to FIGS. 5 and 6.

In a time-domain eICIC scenario with non-colliding Common Reference Signals (CRS), a UE at the cell boundary of a victim cell may be scheduled during ABS sub-frames of the aggressor cells. During an ABS sub-frame, the interference for PDSCH transmission may be reduced significantly—however, the aggressor cells may continue to transmit CRS signals (there exists a second possibility of scheduling MBSFN-ABS sub-frames; these sub-frames do not transmit any CRS signals—however, many network operators prefer not to schedule any MBSFN-ABS sub-frames). The CRS signals do not necessarily collide with the CRS signals of the victim cell and may present a significant disturbance for the PDSCH & PDCCH transmission. In FIG. 4, one example RBSF received at a UE is illustrated. In a time-domain eICIC scenario with colliding common reference signals (CRS), not depicted in FIG. 4, two reference signals of different interfering cells may collide and the signal pattern includes reference signals of these two interfering cells at time-frequency positions.

In the following, a first variant of the method 100 is described that may be also referred to as a "method for parametric CRS interference mitigation". This first variant can e.g. be used for LTE and/or LTE-A systems and may process a receive signal according to the representation of FIG. 6 specified according to 3GPP technical specification TS 36.211, e.g. version V8.4.0 or higher.

The first variant of the method 100 details the estimation of a noise covariance matrix of the REs hit by CRS of the aggressor. Although the first variant of the method 100 is described for Noise-whitening, it can be easily extended and applied to IRC, MMSE, etc.

One can observe in FIG. 4 that REs of the target cell can be classified according to an interference structure and levels experienced by them as follows:
1) CRS, PDCCH & PDSCH REs with negligible interference. The noise covariance of the corresponding REs can be modelled as $$R_n^{NoInterf} = \sigma_n^2 I \qquad (4)$$

where $\sigma_n^2$, is the variance of AWGN.
2) PDCCH & PDSCH REs experiencing extremely high CRS interference from the aggressors. The interference+Noise covariance matrix at data REs hit by CRS of aggressors (Antenna port-i & CRS shift-v) can be expressed as $$R_n^{v,AP-i} = \sum_{j=1}^{Nv} h_{j,AP-i} h_{j,AP-i}^H + \sigma_n^2 I \qquad (5)$$

where $N_v$ is the number of dominating aggressors with CRS shift v and $h_{j,AP-i}$ is the channel of the j-th aggressor from antenna port AP-i.

Taking into account the above interference model, the method 100 may include the following covariance estimation scheme and linear CRS interference mitigation scheme.

Step 1: Estimate noise-covariance based on CRS or DMRS of the target cell according to $$\hat{R}_n^{NoInterf} = E[(y_p - \hat{h}_p x_p)(y_p - \hat{h}_p x_p)^H] \approx \sigma_n^2 I \qquad (6)$$

where $y_p$ is the received pilot signal, $\hat{h}_p$ is the estimated channel of the target cell and $x_p$ is the known pilot signal.

Step 2: Perform Noise-whitening of undisturbed REs (and the corresponding target cell channel estimates) for the REs using the estimated covariance matrix $\hat{R}_n^{NoInterf}$.

Step 3: Perform aggressor channel estimation of each Antenna port i and CRS shift v (Channel estimation of Nv aggressors per CRS shift).

Step 4: Compute Noise covariance matrix for data REs hit by aggressor CRS from AP i and CRS shift v according to $$R_n^{v,AP-i} = \sum_{j=1}^{Nv} \hat{h}_{j,AP-i} \hat{h}_{j,AP-i}^H + \hat{R}_n^{NoInterf} \approx \sum_{j=1}^{Nv} h_{j,AP-i} h_{j,AP-i}^H + \sigma_n^2 I \qquad (7)$$

where $N_v$, is the number of dominating aggressors with CRS shift v and $\hat{h}_{j,AP-i}^H$ is the channel of the j-th aggressor from antenna port AP-i.

Step 5: Perform Noise-whitening of the REs (and the corresponding target cell channel estimates) hit by aggressors from AP-i and CRS shift-v using the estimated covariance matrix $R_n^{v,AP-i}$.

Step 6: Perform Steps 4 and 5 for each Antenna port and CRS shift. Steps 4 and 5 are not necessarily performed on the REs with CRS shift of the target cell (position of REs where CRS of target cell is transmitted).

Step 7: Perform Equalization/detection.

Step 8: Channel decoding (if applicable).

Noise-whitening using the method for parametric CRS interference mitigation during ABS may perform Optimum Combining and hence may result in interference suppression, i.e. increased post-equalization SINR at reduced raw BER and optimum SINR scaling, i.e. reliable soft bits for the channel decoder. Reduced raw BER and reliable soft bits may reduce BLER irrespective of modulation and code rate.

In the following, a second variant of the method 100 is described that may be also referred to as a "method for non-parametric CRS interference mitigation". This second variant can be used for e.g. LTE and/or LTE-A systems and may process a receive signal according to the representation of FIG. 6 specified according to 3GPP technical specification TS 36.211, e.g. version V8.4.0 or higher.

The second variant of the method 100 details the estimation of a noise covariance matrix of the REs hit by CRS of the aggressor. Although the second variant of the method 100 is described for Noise-whitening, it can be easily extended to IRC, MMSE, etc.

One can observe in FIG. 4 that REs of the target cell can be classified according to an interference structure and levels experienced by them as follows:
1) CRS, PDCCH & PDSCH REs with negligible interference. The noise covariance of the corresponding REs can be modelled as $$R_n^{NoInterf} = \sigma_n^2 I \qquad (8)$$

where $\sigma_n^2$ is the variance of AWGN.
2) PDCCH & PDSCH REs experiencing extremely high CRS interference from the aggressors. The interference+Noise covariance matrix at data REs hit by CRS of aggressors (Antenna port-i & CRS shift-v) can be expressed as $$R_n^{v,AP-i} = \sum_{j=1}^{Nv} h_{j,AP-i} h_{j,AP-i}^H + \sigma_n^2 I \qquad (9)$$

where $N_V$ is the number of dominating aggressors with CRS shift v and $h_{j,AP-i}$ is the channel of the j-th aggressor from antenna port AP-i.

Taking into account the above interference model, the method 100 may include the following covariance estimation scheme and linear CRS interference mitigation scheme.

Step 1: Estimate noise-covariance based on CRS or DMRS of the target cell according to $$\hat{R}_n^{NoInterf} = E[(y_p - \hat{h}_p x_p)(y_p - \hat{h}_p x)^H] \approx \sigma_n^2 I \qquad (10)$$

where $y_p$ is the received pilot signal, $\hat{h}_p$ is the estimated channel of the target cell and $x_p$ is the known pilot signal.

Step 2: Perform Noise-whitening of undisturbed REs (and the corresponding target cell channel estimates) for the REs using the estimated covariance matrix $\hat{R}_n^{NoInterf}$.

Step 3: Estimate Noise covariance matrix for data REs hit by aggressor CRS from AP i and CRS shift v according to $$R_n^{v,AP-i} = \qquad (11)$$

-continued $$E[y_{v,AP-i} y_{v,AP-i}^H] - E[\hat{g}_{target}\hat{g}_{target}^H] \approx \sum_{j=1}^{N_v} h_{j,AP-i} h_{j,AP-i}^H + \sigma_n^2 I$$

where $y_{v,AP-i}$ are the REs hit by CRS interference from aggressors with CRS shift v and antenna port i and $\hat{g}$ is the effective channel estimate of the target cell. The effective channel $\hat{g}_{target}$ can be estimated according to the following:

$\hat{g}_{target} = (P_{DPR})^{1/2} \hat{h}_{target,CRS} W$, for transmission modes without UE-specific reference signals; and $\hat{g}_{target} = \hat{h}_{target,DMRS}$, for transmission modes with UE-specific reference signals.

$\hat{h}_{target,CRS}$ is the channel estimate of the target cell based on CRS. W is the pre-coding matrix. $P_{DPR}$ is the ratio between the power of the reference signals and the data REs. $P_{DPR}$ may be signaled to the UE or the UE estimates it. $\hat{h}_{target,DMRS}$ is the channel estimate based on UE-specific reference signals like DMRS.

Step 4: Perform Noise-whitening of the REs (and the corresponding target cell channel estimates) hit by aggressors from AP-i and CRS shift-v using the estimated covariance matrix $R_n^{v,AP-i}$.

Step 5: Perform Steps 3 and 4 for each antenna port and CRS shift. Steps 3 and 4 are not necessarily performed on the REs with CRS shift of the target cell (position of REs where CRS of target cell is transmitted).

Step 6: Perform Equalization/detection.

Step 7: Channel decoding (if applicable).

Noise-whitening using the second variant of the method for non-parametric CRS interference mitigation may provide a low complexity estimation scheme, since no channel estimation of the aggressor needs to be performed. It may further provide robust performance over a wide range of geometries and a similar performance as a CRS canceling receiver at low geometries.

In the following, a third variant of the method 100 is described that may be also referred to as a "method for CRS interference cancellation and rejection". This third variant can be used for LTE and/or LTE-A systems and may process a receive signal according to the representation of FIG. 6 specified according to 3GPP technical specification TS 36.211, e.g. version V8.4.0 or higher.

The third variant of the method 100 details the estimation of a noise covariance matrix of the REs hit by CRS of the aggressor. Although the third variant of the method 100 is described for Noise-whitening, it can be easily extended to IRC, MMSE, etc. The method 100 may provide a scalable and robust CRS interference mitigation scheme.

Taking into account the above interference model, the third variant of the method 100 may include the following covariance estimation scheme and CRS interference mitigation scheme:

Step 1: Estimate noise-covariance based on CRS or DMRS of the target cell according to $$\hat{R}_n^{NoInterf} = E[(y_p - \hat{h}_p x_p)(y_p - \hat{h}_p x_p)^H] \approx \sigma_n^2 I \quad (12)$$

where $y_p$ is the received pilot signal, $\hat{h}_p$ is the estimated channel of the target cell and $x_p$ is the known pilot signal.

Step 2: Perform Noise-whitening of undisturbed REs (and the corresponding target cell channel estimates) for the REs using the estimated covariance matrix $\hat{R}_n^{NoInterf}$.

Step 3: Perform channel estimation of Nd aggressors for antenna port i and CRS shift v. Nd denotes a design parameter dictated by the complexity that the UE can handle. Typically Nd can be 1<Nd≤Nv, where Nv is the number of dominating aggressors in CRS shift v.

Step 4: Perform CRS interference cancellation on REs hit by CRS transmitted by the aggressors in Antenna port i and CRS shift v. One can observe in the following equation that the signal after interference cancellation still may have some residual interference due to channel estimation error and interference from other aggressors which are not considered.

$$y_{Post-IC}^{v,AP-i} = y_{Pre-IC}^{v,AP-i} - \underbrace{\sum_{l=1}^{N_d} \hat{h}_{l,AP-i} x_{l,AP-i}}_{CRS-IC \text{ of } N_d \text{ Aggressors}} \quad (13)$$

$$= y_{Pre-IC}^{v,AP-i} - \sum_{l=1}^{N_d} (h_{l,AP-i} + \varepsilon_{l,AP-i}) x_{l,AP-i}$$

$$= g_{target} x_{target} + \underbrace{\sum_{l=1}^{N_d} \varepsilon_{l,AP-i} x_{l,AP-i}}_{\text{Residual interference due to channel estimation errors}} +$$

$$\sum_{j=N_d+1}^{N_v} h_{j,AP-i} x_{j,AP-i} + n$$

where $$y_{Pre-IC}^{v,AP-i} = \underbrace{g_{target} x_{target}}_{\text{Target Signal}} + \underbrace{\sum_{l=1}^{N_d} h_{l,AP-i} x_{l,AP-i}}_{\text{CRS interference from } N_d \text{ aggressors}} + \quad (14)$$

$$\underbrace{\sum_{j=N_v+1}^{N_v} h_{j,AP-i} x_{j,AP-i}}_{\text{CRS interference from other Aggressors}} + \underbrace{n}_{\text{Other Interference & AWGN}}$$

is the received RE before CRS-IC, Nv is the number of dominating aggressors with CRS shift v and $\hat{h}_{j,AP-i}$ is the channel estimate of the j-th aggressor from antenna port AP-i.

Step 5: Estimate Interference+Noise covariance matrix on the CRS interference cancelled REs $y_{Post-IC}^{v,AP-i}$ from Step 4. One can observe in the following equation that the estimated covariance matrix may account for the channel estimation errors and other unaccounted interference. It is noted that one can also use other methods to estimate the covariance matrix.

$$\hat{R}_{Post-IC}^{v,AP-i} = E[y_{Post-IC}^{v,AP-i}(y_{Post-IC}^{v,AP-i})^H - \hat{g}_{target}\hat{g}_{target}^H] \approx \quad (15)$$

$$\underbrace{\sum_{l=1}^{N_d} \varepsilon_{l,AP-i} \varepsilon_{l,AP-i}^H}_{\substack{\text{Covariance of} \\ \text{Residual interference} \\ \text{due to channel} \\ \text{estimation errors}}} + \underbrace{\sum_{j=N_d+1}^{N_v} h_{j,AP-i} h_{j,AP-i}^H}_{\substack{\text{Covariance of unaccounted} \\ \text{CRS interference}}} + \underbrace{nn^H}_{\substack{\text{Covariance of} \\ \text{other interference} \\ \text{and AWGN}}}$$

where $\hat{g}_{target}$ target is the effective channel estimate of the target cell.

Step 6: Perform Noise-whitening on the interference cancelled REs $y_{Post-IC}^{v,AP-i}$ (and the corresponding target cell channel estimates) hit by aggressors from AP-i and CRS shift-v using the estimated covariance matrix $\hat{R}_{Post-IC}^{v,AP-i}$.

Step 7: Perform Steps 3 to 6 for each Antenna port and CRS shift. Steps 3 to 6 are not necessarily performed on the REs with CRS shift of the target cell (Position of REs where CRS of target cell is transmitted).

Step 8: Perform equalization/detection.

Step 9: Channel decoding (if applicable).

The third variant of the method 100 can completely suppress Nd+Nrx−1 interferers per CRS shift. Nrx is the number of receive antennas. Nd interferers may be canceled due to CRS-IC (Step 4) and Nrx−1 interferers may be suppressed due to Noise-whitening (Step 5). It is noted that linear interference mitigation schemes according to the first and second variants of the method 100 can completely suppress Nrx−1 interferers.

The third variant of the method 100 may offer the following advantages: Robust CRS interference cancellation taking into account channel estimation error and hence reducing error propagation. Scalable complexity and performance. Complexity may be dominated by a number of aggressor channel estimates performed for CRS interference cancellation and it can be controlled by the design parameter Nd. The unaccounted interference can still be suppressed through noise-whitening. The variant is applicable to PDSCH, PDCCH and all control channels.

Figure 5:
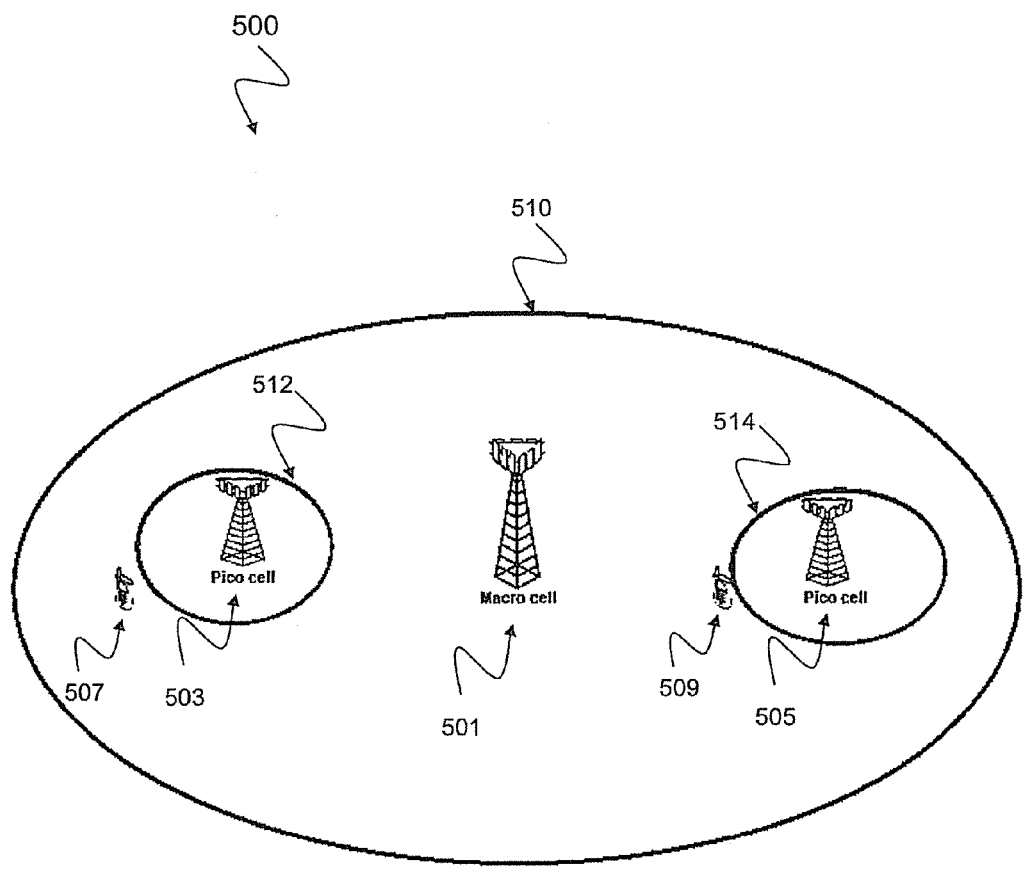
FIG. 5 is a schematic diagram of a heterogeneous network 500 including a macro cell and pico cells.

FIG. 5 is a schematic diagram of a heterogeneous network 500 including a macro cell 501 and pico cells 503, 505. The pico base stations 503, 505 may be characterized by substantially lower transmit power as compared to the macro base station 501. Due to the large disparity between the transmit power levels among two type of base stations, the coverage 512, 514 of the pico base station 503, 505 is significantly limited than the coverage 510 of the macro base station 501 as shown in FIG. 5. The larger coverage 510 of the macro cells 501 may attract more users 507, 509 towards high power macro eNodeB although there might not be enough resources to efficiently serve all user terminals. At the same time, the resources of smaller power base station may remain underutilized.

The methods 100, 300 as described above with respect to FIGS. 1, 3 and 4 may be applied in such a heterogeneous network 500. The user equipments 507, 509 may implement these methods 100, 300 for flexibly connecting to either a macro cell 501 or a pico cell 503, 505. In addition, the device 200 described above with respect to FIG. 2 may be implemented in such user equipment 507, 509.

Figure 6:
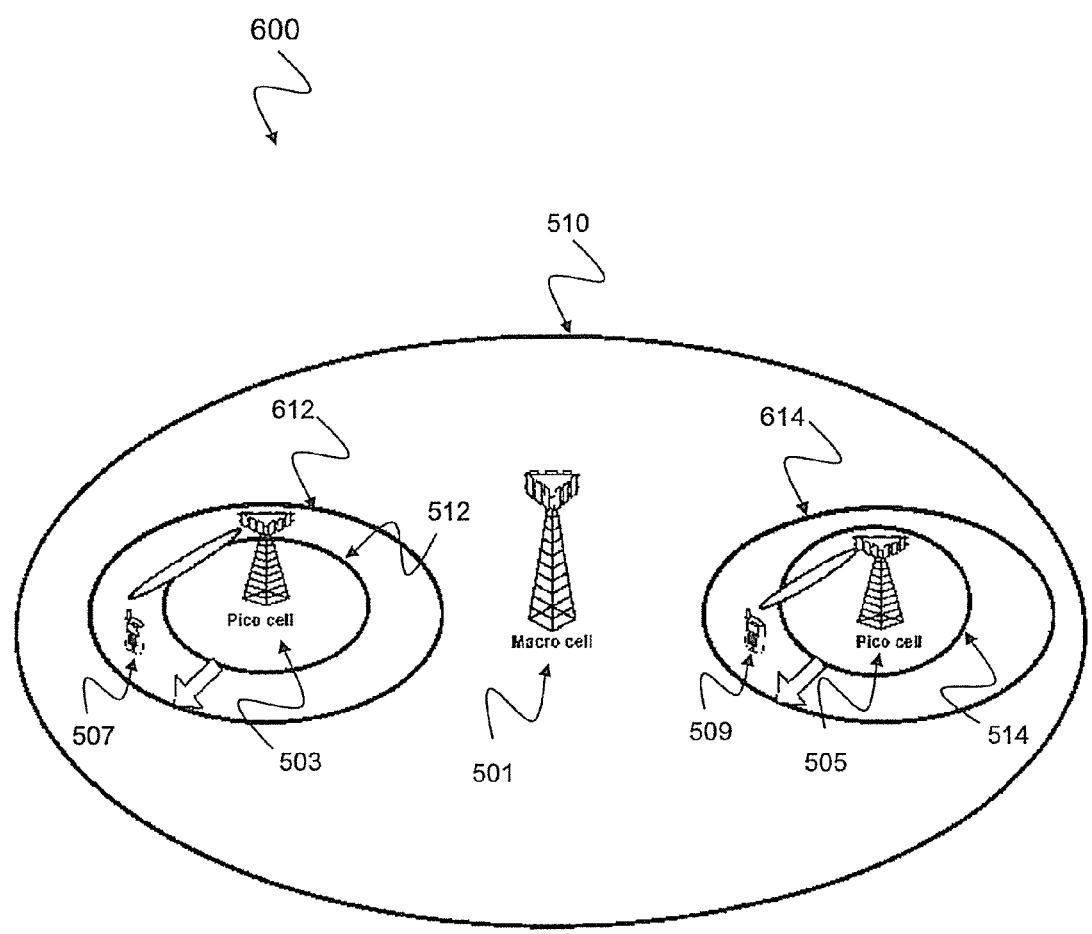
FIG. 6 is a schematic diagram of a heterogeneous network 600 illustrating cell range expansion of pico cells.

FIG. 6 is a schematic diagram of a heterogeneous network 600 illustrating cell range expansion of pico cells. In order to enable pico UEs to operate in harsh interference scenarios, the concept of cell range expansion may be introduced. The cell range 512, 514 of the pico cell 503, 505 may be expanded to an expanded range 612, 614 in order to allow more terminals to connect to the pico eNodeB 503, 505 as shown in FIG. 6. With cell range expansion, traffic may be offloaded from the macro cell and a more balanced load distribution across the various nodes is achieved.

The methods 100, 300 as described above with respect to FIGS. 1, 3 and 4 may be applied in such a heterogeneous network 600. The user equipments 507, 509 may implement the methods 100, 300 for flexibly connecting to either the macro cell 501 or the pico cell 503, 505. The device 200 described above with respect to FIG. 2 may be implemented in such user equipment 507, 509.

Figure 7:
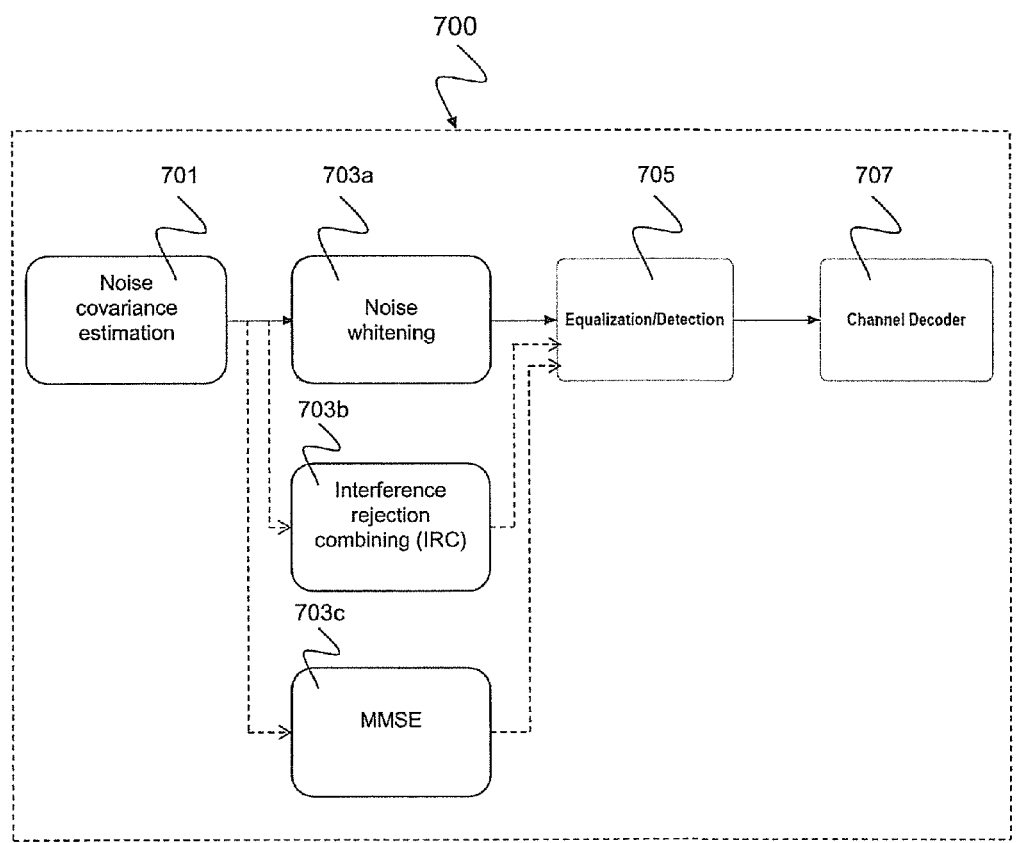
FIG. 7 is a schematic diagram of an interference mitigation receiver 700 in accordance with the disclosure.

FIG. 7 is a schematic diagram of an interference mitigation receiver 700. The interference mitigation receiver 700 may include a noise covariance estimation unit 701, a noise whitening unit 703a, an equalization and detection unit 705, and a channel decoder 707. The noise covariance estimation unit 701 may estimate noise covariance measures, e.g. noise covariance matrices, as described above with respect to FIGS. 1, 2 and 3. The noise whitening unit may perform noise whitening on the basis of the estimated noise covariance measures according to the method 100 described above with respect to FIG. 1 or according to the method 300 described above with respect to FIG. 3.

In one example, the interference mitigation receiver 700 may include an interference rejection combining unit 703b for performing interference rejection combining based on the estimated noise covariance measures according to the method 100 described above with respect to FIG. 1 or according to the method 300 described above with respect to FIG. 3.

In one example, the interference mitigation receiver 700 may include an minimum mean square error estimation (MMSE) unit 703c for performing MMSE estimation based on the estimated noise covariance measures according to the method 100 described above with respect to FIG. 1 or according to the method 300 described above with respect to FIG. 3.

In one example, the interference mitigation receiver 700 may include a CRS canceling receiver. The CRS canceling receiver may be any kind of receiver that may cancel CRS REs received from one or more dominant interfering cells from the wanted signal of the serving cell. Knowledge of the CRS REs of the interfering cell(s) may be assumed. Canceling CRS REs from the wanted signal may require channel estimation of the channel from the UE to interfering cell. The wanted signal can be any kind of channel sent by the serving cell including PDSCH, PDCCH, serving cell CRS, etc. A CRS canceling receiver may be principally applicable to e.g. PDSCH and PDCCH. The receiver may cancel the interference based on the estimated covariance measures, estimated according to the method 100, 300 described above with respect to FIGS. 1 and 3.

Figure 8A:
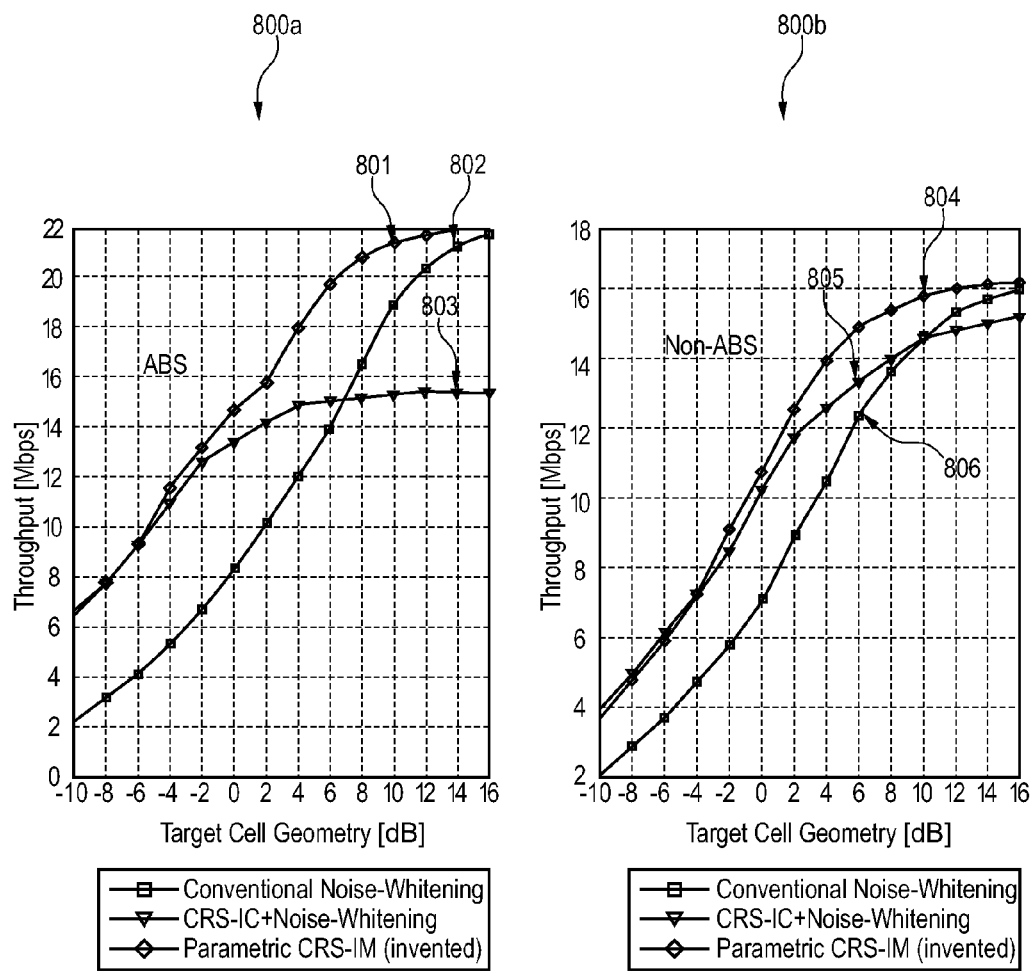
FIG. 8a is a performance diagram illustrating data throughput of a parametric CRS interference suppression receiver in an ABS scenario 800a and in a non-ABS scenario 800b.

FIG. 8a shows a performance diagram illustrating data throughput of a parametric CRS interference suppression receiver in an ABS scenario 800a and in a non-ABS scenario 800b. Link level simulations with ideal link adaptation were performed when aggressor transmits ABS & Non-ABS.

In the ABS scenario 800a, curve 801 illustrates a method 100 referred to as a method for parametric CRS interference mitigation according to the first variant. Curve 802 illustrates a conventional noise whitening. Curve 803 illustrates a conventional CRS interference canceling and noise whitening.

In the non-ABS scenario 800a, curve 804 illustrates a method 100 referred to as a method for parametric CRS interference mitigation according to the first variant. Curve 806 illustrates a conventional noise whitening. Curve 805 illustrates a conventional CRS interference canceling and noise whitening.

One can observe the following from FIG. 8a: The CRS IM receiver according to the first variant of the method 100 may outperform conventional receivers without CRS interference suppression capabilities by about 5 to 7 dB during ABS. The CRS IM receiver according to the first variant of the method 100 may outperform conventional receivers without CRS interference suppression capabilities by about 3 to 4 dB during Non-ABS. In contrast to CRS cancellation receivers, the receiver according to the first variant of the method 100 may be robust over a wide range of SNRs.

The first variant of the method 100 may provide estimation of the interference+noise covariance matrix for REs severely hit by CRS of aggressor applying noise whitening using the estimated covariance matrices to suppress interference. Therefore, the first variant of the method 100 may provide robust performance over a wide range of geometries and similar performance as a CRS canceling receiver at low geometries.

Figure 8B:
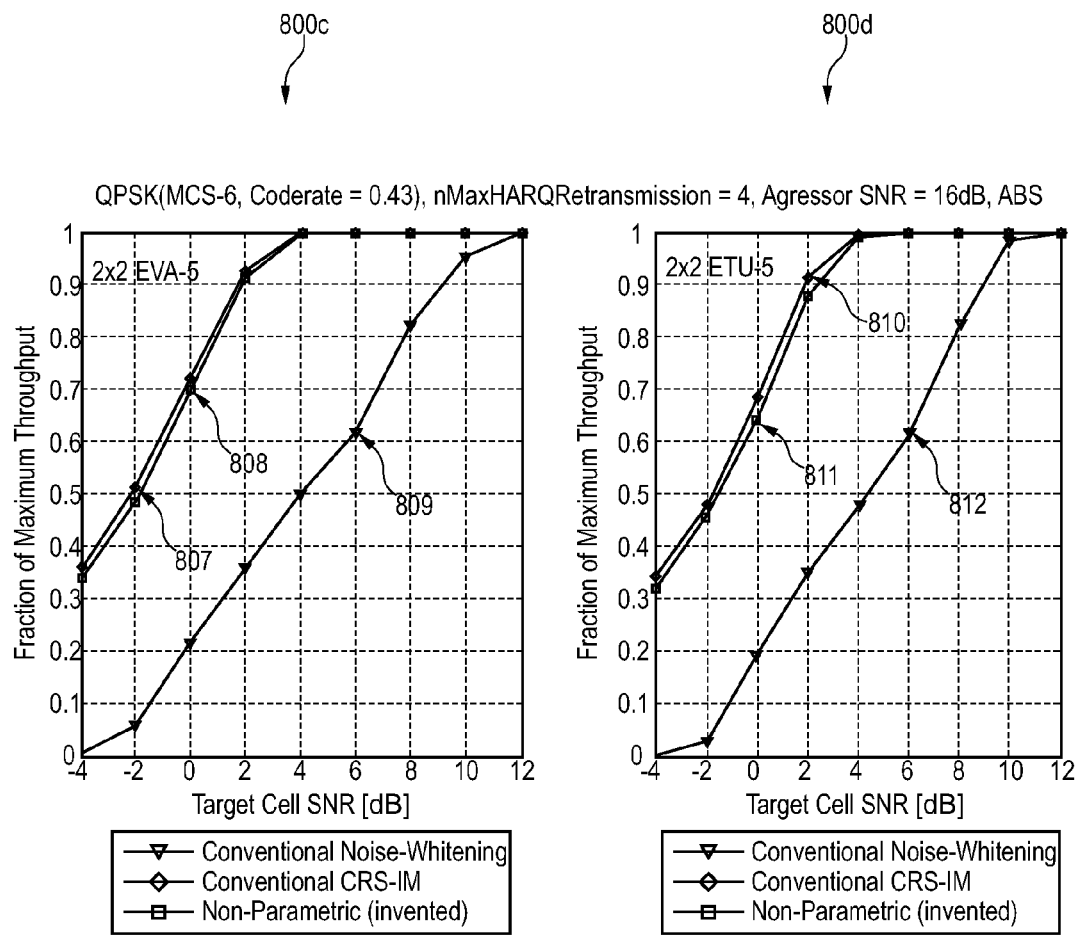
FIG. 8b is a performance diagram illustrating data throughput of a non-parametric CRS interference suppression receiver for a QPSK code rate of 0.43 in an EVA-5 channel scenario 800c and in an ETU-5 channel scenario 800d.

FIG. 8b is a performance diagram illustrating data throughput of a non-parametric CRS interference suppression receiver for a QPSK code rate of 0.43 in an EVA-5 channel scenario 800c and in an ETU-5 channel scenario 800d. Link level simulations with a maximum 4 re-transmissions were performed when the aggressor transmits ABS.

In the EVA-5 channel scenario 800c, curve 808 illustrates a method 100 referred to as a method for non-parametric CRS interference mitigation according to the second variant. Curve 809 illustrates a conventional noise whitening. Curve 807 illustrates a conventional CRS interference mitigation (CRS-1 M).

In the ETU-5 channel scenario 800d, curve 811 illustrates a method 100 referred to as a method for non-parametric CRS interference mitigation according to the second variant. Curve 812 illustrates a conventional noise whitening. Curve 810 illustrates a conventional CRS interference mitigation (CRS-IM).

Figure 8C:
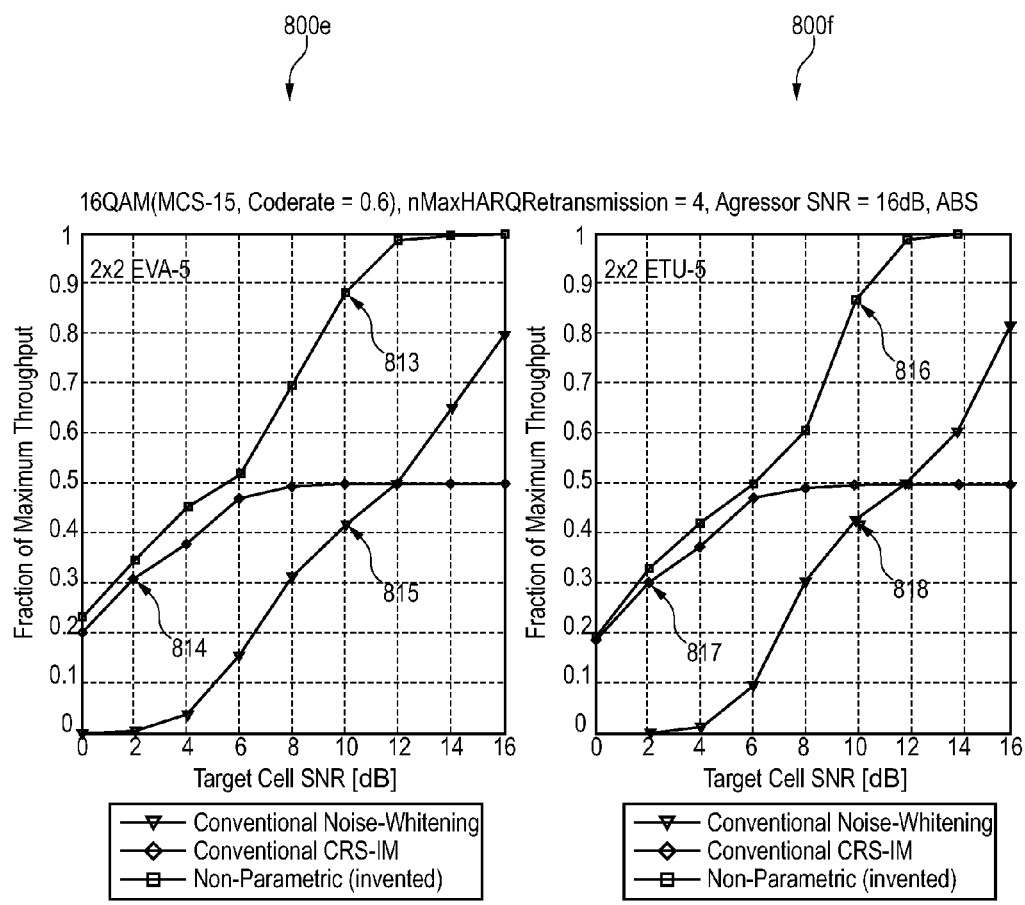
FIG. 8c is a performance diagram illustrating data throughput of a non-parametric CRS interference suppression receiver for a 16-QAM code rate of 0.6 in an EVA-5 channel scenario 800e and in an ETU-5 channel scenario 800f.
Figure 8D:
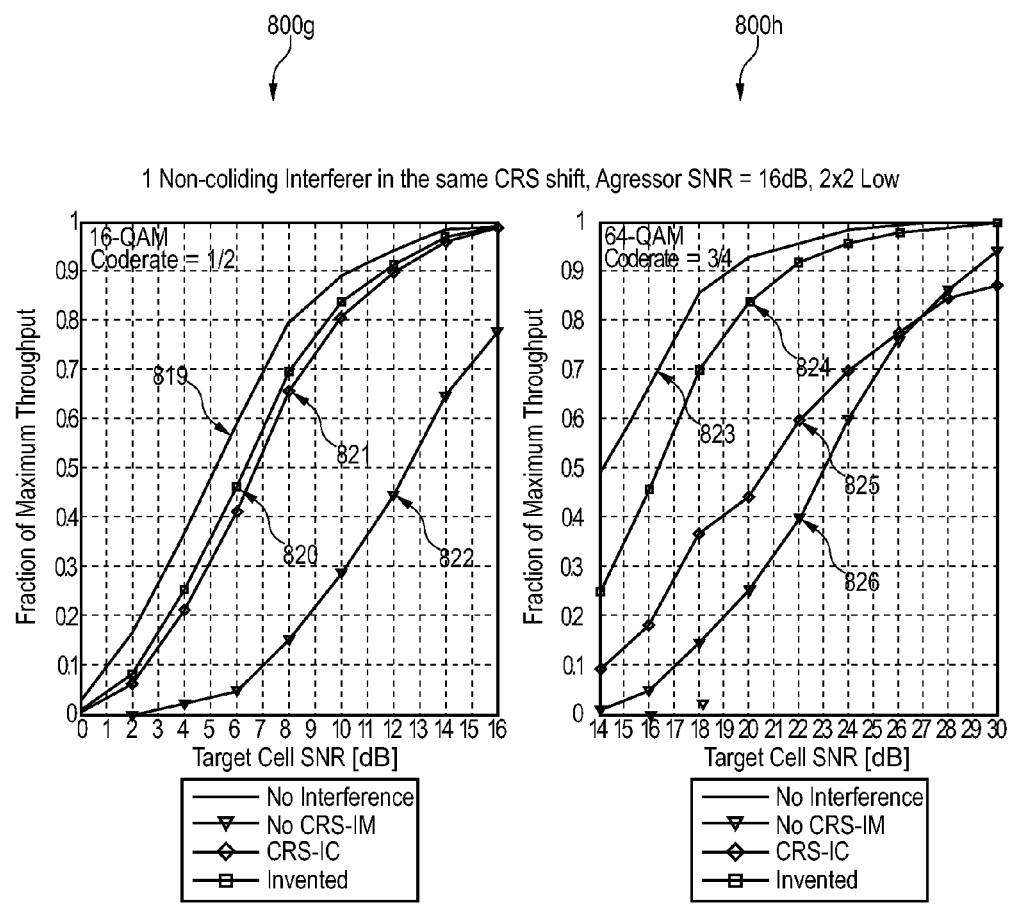
FIG. 8d is a performance diagram illustrating data throughput of a CRS interference cancellation and rejection receiver for one non-colliding interferer in the same CRS shift for a 16-QAM, code rate 0.5 scenario 800g and for a 64QAM, code rate 0.75 scenario 800h.
Figure 8E:
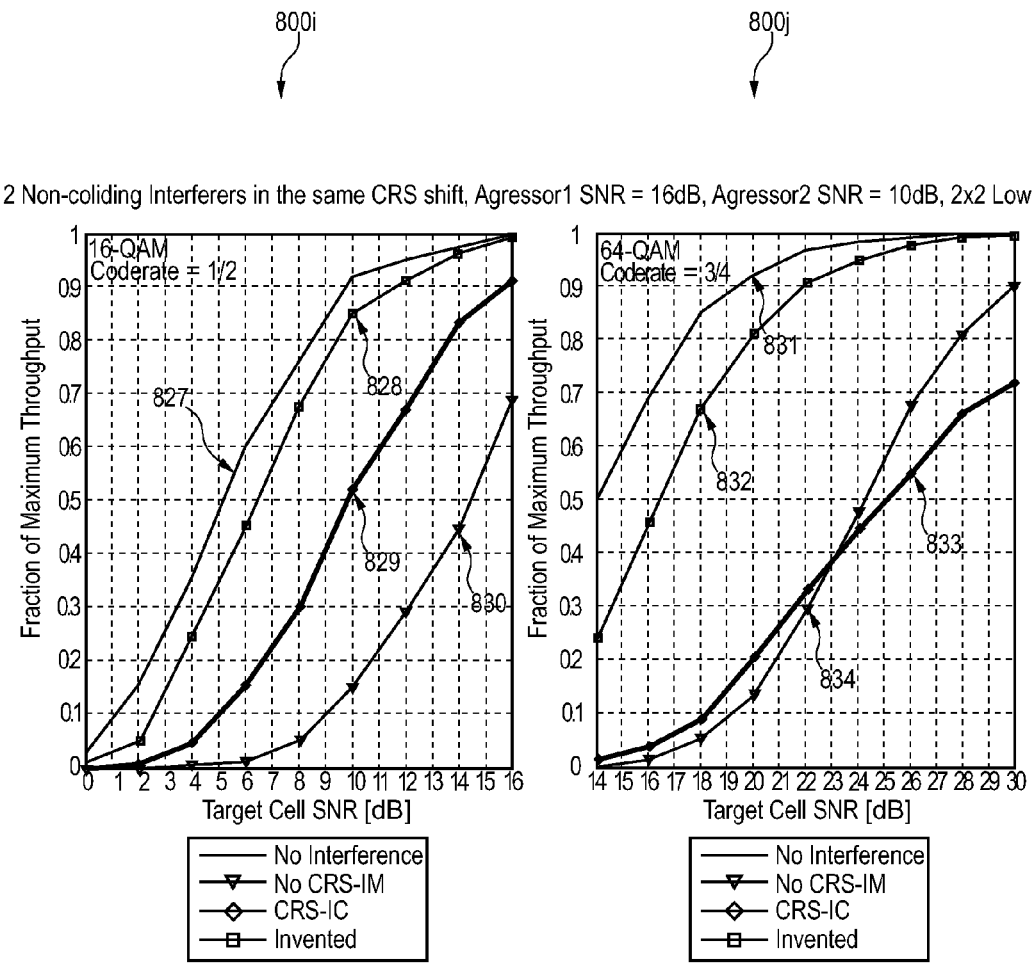
FIG. 8e is a performance diagram illustrating data throughput of a CRS interference cancellation and rejection receiver for two non-colliding interferer in the same CRS shift for a 16-QAM, code rate 0.5 scenario 800i and for a 64QAM, code rate 0.75 scenario 800j.

FIG. 8e is a performance diagram illustrating data throughput of a non-parametric CRS interference suppression receiver for a 16-QAM code rate of 0.6 in an EVA-5 channel scenario 800e and in an ETU-5 channel scenario 800f. Link level simulations with a maximum 4 re-transmissions were performed when aggressor transmits ABS.

In the EVA-5 channel scenario 800e, curve 813 illustrates a method 100 referred to as a method for non-parametric CRS interference mitigation according to the second variant. Curve 815 illustrates a conventional noise whitening. Curve 814 illustrates a conventional CRS interference mitigation (CRS-IM).

In the ETU-5 channel scenario 800f, curve 816 illustrates a method 100 referred to as a method for non-parametric CRS interference mitigation according to the second variant. Curve 818 illustrates a conventional noise whitening. Curve 817 illustrates a conventional CRS interference mitigation (CRS-IM).

One can observe the following from FIGS. 8b and 8c: The CRS IM receiver according to the second variant of the method 100 may outperform conventional receivers without CRS interference suppression capabilities by about 6 dB. In contrast to conventional CRS Interference mitigation receivers, the receiver according to the second variant of the method 100 may be robust over a wide range of SNRs, modulation and code rates.

The receiver according to the second variant of the method 100 may provide non-parametric estimation, i.e. statistical estimation, of the interference+noise covariance matrix for REs hit by CRS of the aggressor. No aggressor channel estimation needs to be performed.

FIG. 8g is a performance diagram illustrating data throughput of a CRS interference cancellation and rejection receiver for one non-colliding interferer in the same CRS shift for a 16-QAM, code rate 0.5 scenario 800g and for a 64QAM, code rate 0.75 scenario 800h. Link level simulations were performed with one and two aggressors per CRS shift.

In the 16-QAM code rate 0.5 channel scenario 800g, curve 820 illustrates a method 100 referred to as a method for CRS interference cancellation and rejection according to the third variant. Curve 822 illustrates a conventional CRS interference mitigation (CRS-IM). Curve 821 illustrates a conventional CRS interference cancellation (CRS-IC). Curve 819 illustrates the maximum throughput when no interference is present.

In the 64-QAM code rate 0.75 channel scenario 800h, curve 824 illustrates a method 100 referred to as a method for CRS interference cancellation and rejection according to the third variant. Curve 826 illustrates a conventional CRS interference mitigation (CRS-IM). Curve 825 illustrates a conventional CRS interference cancellation (CRS-IC). Curve 823 illustrates the maximum throughput when no interference is present.

FIG. 8i is a performance diagram illustrating data throughput of a CRS interference cancellation and rejection receiver for two non-colliding interferer in the same CRS shift for a 16-QAM, code rate 0.5 scenario 800i and for a 64QAM, code rate 0.75 scenario 800j. Link level simulations were performed with one and two aggressors per CRS shift.

In the 16-QAM code rate 0.5 channel scenario 800i, curve 828 illustrates a method 100 referred to as a method for CRS interference cancellation and rejection according to the third variant. Curve 830 illustrates a conventional CRS interference mitigation (CRS-IM). Curve 829 illustrates a conventional CRS interference cancellation (CRS-IC). Curve 827 illustrates the maximum throughput when no interference is present.

In the 64-QAM code rate 0.75 channel scenario 800j, curve 832 illustrates a method 100 referred to as a method for CRS interference cancellation and rejection according to the third variant. Curve 834 illustrates a conventional CRS interference mitigation (CRS-IM). Curve 833 illustrates a conventional CRS interference cancellation (CRS-IC). Curve 831 illustrates the maximum throughput when no interference is present.

One can observe the following from FIG. 8i, where one aggressor is present per CRS shift: The receiver according to the third variant of the method 100 may outperform receivers without CRS interference handling capabilities by 7 to 8 dB at 70% throughput. The receiver according to the third variant of the method 100 may outperform conventional CRS interference cancellation receivers by 0.5 to 6 dB at 70% throughput. The robustness of receivers according to the third variant of the method 100 may be clearly visible in medium to high SNRs where the channel estimation error of the aggressor is not negligible.

One can observe the following from FIG. 8j, where two aggressors are present per CRS shift: The receiver according to the third variant of the method 100 may outperform receivers without CRS interference handling capabilities by ~8 dB at 70% throughput. Receivers according to the third variant of the method 100 may outperform conventional CRS interference cancellation receivers by 5 to 10.5 dB at 70% throughput. Most notably the performance of the receiver according to the third variant of the method 100 may be almost similar to the one aggressor case (~0.2 to 0.4 dB).

The receiver according to the third variant of the method 100 may provide CRS interference cancellation on REs (Resource elements) hit by CRS from aggressors. The receiver according to the third variant of the method 100 may provide estimation of interference+noise covariance matrix on the interference canceled REs to whiten/suppress residual interference due to aggressor channel estimation errors and other unaccounted interference. The receiver according to the third variant of the method 100 may provide noise whitening using the estimated covariance matrices to mitigate residual and unaccounted interference. The receiver according to the third variant of the method 100 may provide a robust and scalable CRS interference mitigation framework.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

What is claimed is:

1. A method, comprising:
   receiving a signal comprising a two-dimensional signal pattern in a time-frequency representation, wherein the two-dimensional signal pattern comprises a first reference signal at a predetermined first position in the two-dimensional signal pattern and at least one second reference signal at a predetermined second position in the two-dimensional signal pattern, wherein the first reference signal comprises cell identification information of a target cell of a cellular radio system and the at least one second reference signal comprises cell identification information of at least one interfering cell of the cellular radio system;
   further wherein a position of a first part of the at least one second reference signal is spaced apart by a predetermined frequency shift from a position of a first part of the first reference signal, wherein the predetermined frequency shift corresponds to an interfering cell;
   mitigating interference in the cellular radio system by:
      determining a first noise covariance measure based on pilot signals of the target cell in the first reference signal;
      based at least on the first noise covariance measure, noise whitening first data resource elements of the signal that are from the target cell with no cell-specific reference signal interference;
      determining at least one second noise covariance measure based on an antenna port and the frequency shift of the interfering cell;
      based at least on the second noise covariance measure:
         noise whitening second data resource elements of the signal that are from the target cell hit with cell-specific reference signal interference; and
         noise whitening channel estimates of the target cell corresponding to the second data resource elements.

2. The method of claim 1, wherein the first reference signal and the at least one second reference signal comprise cell-specific reference signals.

3. The method of claim 1, wherein the first reference signal comprises a first part corresponding to a first antenna port of a plurality of antenna ports of the target cell and a second part corresponding to a second antenna port of the plurality of antenna ports of the target cell, and wherein the at least one second reference signal comprises a first part corresponding to a first antenna port of a plurality of antenna ports of the interfering cell and a second part corresponding to a second antenna port of the plurality of antenna ports of the interfering cell.

4. The method of claim 1, wherein the position of a second part of the at least one second reference signal in the two-dimensional signal pattern is spaced apart by the predetermined frequency shift from the position of a second part of the first reference signal in the two-dimensional signal pattern.

5. The method of claim 1, wherein each of the at least one second reference signal corresponds to an interfering cell.

6. The method of claim 1, wherein the predetermined frequency shift corresponds to multiple interfering cells.

7. The method of claim 1, further comprising:
   determining channel coefficients of an interfering cell with respect to the corresponding antenna port and frequency shift of the interfering cell;
   determining the at least one second noise covariance measure with respect to the antenna port and the frequency shift of the interfering cell based on the estimated channel coefficients with respect to the corresponding antenna port and frequency shift of the interfering cell.

8. The method of claim 1, wherein determining the at least one second noise covariance measure is performed for each antenna port and frequency shift unequal to an antenna port and a frequency shift corresponding to the target cell.

9. The method of claim 1, further comprising:
   determining the at least one second noise covariance measure with respect to the antenna port and the frequency shift of the interfering cell based on the at least one second reference signal with respect to the corresponding antenna port and frequency shift of the interfering cell and estimated channel coefficients of the target cell.

10. The method of claim 9, wherein the channel coefficients of the target cell are estimated based on a known pre-coding matrix.

11. The method of claim 1, further comprising:
    determining channel coefficients of a predetermined number of interfering cells with respect to the corresponding antenna ports and frequency shifts of the interfering cells;
    interference-canceling the at least one second reference signal with respect to the corresponding antenna ports and frequency shifts of the interfering cells based on the determined channel coefficients of the interfering cells; and
    determining the at least one second noise covariance measure with respect to the antenna port and the frequency shift of the interfering cell based on the data resource elements of the target cell where the interference-canceling is performed with respect to the corresponding antenna port and frequency shift of the interfering cell.

12. The method of claim 11, wherein determining the channel coefficients of the predetermined number of interfering cells, interference-canceling the at least one second reference signals, determining the at least one second noise covariance measure and noise whitening the second elements of the two-dimensional signal pattern is performed for each antenna port and frequency shift unequal to an antenna port and a frequency shift corresponding to the target cell.

13. The method of claim 11, wherein the predetermined number of interfering cells with respect to an antenna port and frequency shift is smaller than a number of dominant aggressor cells with respect to the corresponding antenna port and frequency shift.

14. A device, comprising:
a first unit configured to receive a signal comprising a two-dimensional signal pattern in a time-frequency representation, wherein the two-dimensional signal pattern comprises a first reference signal at a predetermined first position in the two-dimensional signal pattern and at least one second reference signal at a predetermined second position in the two-dimensional signal pattern, wherein the first reference signal comprises cell identification information of a target cell of a cellular radio system and the at least one second reference signal comprises cell identification information of at least one interfering cell of the cellular radio system;
further wherein a position of a first part of the at least one second reference signal in the two-dimensional signal pattern is spaced apart by a predetermined frequency shift from a position of a first part of the first reference signal in the two-dimensional signal pattern, wherein the predetermined frequency shift corresponds to an interfering cell;
a second unit configured to mitigate interference in the cellular radio system by determining a first noise covariance measure based on pilot signals of the target cell in the first reference signal;
a third unit configured to mitigate interference in the cellular radio system by determining at least one second noise covariance measure based on an antenna port and the frequency shift of the interfering cell; and
a fourth unit configured to mitigate interference in the cellular radio system by:
based at least on the first noise covariance measure, noise whitening first data resource elements of the signal that are from the target cell with no cell-specific reference signal interference; and
based at least on the second noise covariance measure:
noise whitening second data resource elements of the signal that are from the target cell hit with cell-specific reference signal interference; and
noise whitening channel estimates of the target cell corresponding to the second elements.

15. The device of claim 14, wherein the device comprises a chip, and the device is part of a mobile device.

16. A method, comprising:
receiving a signal comprising a two-dimensional signal pattern in a time-frequency representation, wherein the two-dimensional signal pattern comprises a first reference signal at a predetermined first position in the two-dimensional signal pattern and at least one second reference signal at a predetermined second position in the two-dimensional signal pattern, wherein the first position represents an antenna port and a frequency shift of a target cell of a cellular radio system and the second position represents an antenna port and a frequency shift of at least one interfering cell of the cellular radio system;
determining a first noise covariance measure based on pilot signals of the target cell;
determining channel coefficients of a predetermined number of interfering cells with respect to corresponding antenna ports and frequency shifts of the interfering cells;
interference-canceling the at least one second reference signal with respect to the corresponding antenna ports and frequency shifts of the interfering cells based on the determined channel coefficients of the interfering cells;
determining at least one second noise covariance measure with respect to an antenna port and a frequency shift of the interfering cell based on data resource elements comprised in the received signal where the interference-canceling is performed with respect to the corresponding antenna port and frequency shift of the interfering cell; and
mitigating an interference comprised in the received signal based on the first noise covariance measure and the at least one second noise covariance measure.

17. The method of claim 16, wherein the target cell comprises at least one of a macro base station, a pico cell, a femto cell, and a relay.

* * * * *